(12) United States Patent
Bremicker et al.

(10) Patent No.: US 8,035,045 B2
(45) Date of Patent: Oct. 11, 2011

(54) INVERTER

(75) Inventors: Sven Bremicker, Alheim (DE); Andreas Donth, Edermünde (DE); Manfred Dach, Niedenstein (DE); Matthias Victor, Niestetal (DE)

(73) Assignee: SMA Solar Technology AG, Niestetal (DE)

( * ) Notice: Subject to any disclaimer, the term of this patent is extended or adjusted under 35 U.S.C. 154(b) by 439 days.

(21) Appl. No.: 12/151,169

(22) Filed: May 5, 2008

(65) Prior Publication Data

US 2008/0302643 A1 Dec. 11, 2008

(30) Foreign Application Priority Data

May 23, 2007 (EP) .................................... 07010196

(51) Int. Cl.
*H01H 27/00* (2006.01)
(52) U.S. Cl. ..................................... 200/43.04; 200/293
(58) Field of Classification Search ............... 200/43.04, 200/293, 51 R, 50.09, 50.12, 50.1, 50.28, 200/50.31
See application file for complete search history.

(56) References Cited

U.S. PATENT DOCUMENTS

| 4,091,246 | A | * | 5/1978 | Donofrio et al. | ........... 200/50.28 |
| 5,504,655 | A |   | 4/1996 | Underwood et al. | |
| 6,495,775 | B2 | * | 12/2002 | Lawson et al. | ............. 200/50.28 |
| 2002/0187376 | A1 |   | 12/2002 | Nishiumi | |
| 2003/0102845 | A1 |   | 6/2003 | Aker et al. | |

FOREIGN PATENT DOCUMENTS

JP 2006136097 A * 5/2006

* cited by examiner

*Primary Examiner* — Renee Luebke
*Assistant Examiner* — Lisa Klaus
(74) *Attorney, Agent, or Firm* — Eschweiler & Associates, LLC

(57) ABSTRACT

The subject matter of the invention is an inverter (1), comprising a casing (8) as well as at least one casing cover (2), said casing cover (2) being mechanically engaged with a safety plug (10), said safety plug (10) being in electrical connection with at least the one load-current circuit located on the DC side, the inverter being switched off or disconnected at least from the DC-side load-current circuit after removal of the safety plug from the casing (8).

9 Claims, 4 Drawing Sheets

INVERTER

FIELD OF THE INVENTION

The present invention relates to an inverter.

Inverters are well known; inverters are utilized in particular for generating alternative energy such as with the help of PV modules, to convert direct current into alternating current. An inverter comprises a casing accommodating the electronic components needed for operating the inverter and also a portion accommodating plugs for feeding the direct current supplied by PV modules for example. Such an inverter further has connections into the interior of the casing as well as, at need, what is termed a "communication unit" with a display for displaying for example the amount of current produced at the moment.

PV inverters must be equipped both with an AC breaker and with a DC breaker. In particular when the DC power is not sufficient, the AC breaker permits to ensure that the electronics are disconnected from the AC voltage grid. Through the DC switch, the rated current is switched off. This is to ensure that the inverter may be disconnected without arc from the DC source such as a PV module any time in the case of a short or a failure.

The known inverters are provided with a cover, which, when removed, allows access to the electronics located inside for repair or maintenance works to be performed on the power electronics. Before the cover is removed for allowing access to the power electronics, it is to make certain that no dangerous DC voltages apply to the device in particular. This means that it must be ensured that, when the device is opened, the inverter is securely disconnected from the grid on the one side and that no DC voltages are applied to the device on the other side. This means that the electronics must be at zero potential.

DESCRIPTION OF THE PRIOR ART

In the art, this is achieved by ensuring that no hazardous DC voltages are applied to the inverter once the generally recognized safety rules such as disconnecting, securing the inverter from being switched on again, assessing that the potential is at zero, grounding and shorting, at need covering or encapsulating are completed. The problem herewith is that the operations imposed by the safety rules have to be performed meticulously by the operator in order to exclude any risk to such persons. Since the imposed safety rules are not always followed, accidents continue to happen.

BRIEF SUMMARY OF THE DESCRIPTION

It is therefore the object of the invention to remedy this problem and more specifically to ensure that, when the inverter casing is being opened, no hazardous DC voltages are applied to the inverter.

In accordance with the invention, this object is solved in that, on an inverter having a cover, there is provided at least one casing cover, said casing cover being mechanically engaged with a safety plug, said safety plug being in electrical connection with at least one load-current circuit located on the DC side, a switch being activated once the safety plug has been pulled out of the casing for disconnecting the inverter at least from the DC-side load-current circuit. It is obvious therefrom that, since the safety plug mechanically locks the cover, the casing cannot be opened unless the safety plug has been pulled out before. Pulling the safety plug activates a switch that switches or disconnects the inverter at least from the DC-side load-current circuit.

In the prior art document U.S. Pat. No. 5,504,655 A, it is known to provide a control module for the current supply of an electric vehicle with a removable hood, said hood comprising an opening for passing a plug therethrough and only being removable when the plug has been pulled. The plug hereby serves for supplying current through a battery.

Advantageous features of the invention and embodiments thereof will become apparent from the subordinate claims.

Advantageously, the plug connects the inverter to the load-current circuits both on the DC and on the AC side. This means that the inverter is disconnected from the corresponding load-current circuits both on the AC and on the DC side, when the safety plug is pulled.

There is provided in particular that two switches may be activated by the safety plug, the inverter being disconnected from the load-current circuit on the DC side by one switch and from the load-current circuit on the AC side by another switch so that no current flows any longer. It is also necessary to disconnect it from the AC side since currents may still flow through capacitors in the power electronics even if the inverter has already been switched off or disconnected from the current source on the DC side. Only then, meaning when it has been disconnected from the AC-side, will the direct current intermediate circuit be at zero potential.

Referring to the mechanical interlock between the casing cover and the safety plug, there is advantageously provided that the casing cover comprises at least one eyelet on the casing side through which the safety plug extends. This means that it is not possible to lift the cover if the safety plug is not pulled. Thus, it is made certain in any case that, when the cover is lifted for allowing access to the interior of the casing, the electronics inside the inverter casing is at zero potential.

More specifically, the safety plug comprises a plug head and a plug body, said plug body extending through the at least one eyelet of the casing cover. The plug body is disposed such that the safety plug is clearly visible from outside and may also be readily pulled out.

According to a particular feature of the invention, the inverter casing includes at least two casing chambers, at least two casing covers being provided for covering the casing chambers, the one first casing cover, which is mechanically engaged with the safety plug, covering fastening elements of the other, second casing cover in the closed state so that the other, second casing cover can only be removed once the one first casing cover has been removed. Such an embodiment relies on the following consideration:

An inverter accommodates a whole series of electronic components, and also a plurality of connector plugs or sockets, the electrician performing the connection not needing to access the power electronics of the inverter for connecting the inverter. It is sufficient if the electrician has access to the connections and at need to the communication unit. For this purpose there is provided, as already explained, that the inverter comprises two casing chambers, the one first casing chamber advantageously housing the connecting elements such as plugs, sockets, and the like but also electronic components, but also for example the communication unit, and the other, second casing chamber accommodating the electronic components of the inverter which must be accessible for repair or maintenance. In the sense of a two-step safety concept, it is ensured that the other second cover of the second casing chamber accommodating the power electronic components can only be opened once the one first cover has been removed after the safety plug has been pulled. For, as already explained, the first cover covers the fastening elements, such as screws fixing the other second casing cover to the casing, in such a manner that they are only accessible after the one first casing cover has been removed.

The invention will be explained in closer detail herein after with respect to the drawings.

DETAILED DESCRIPTION OF THE INVENTION

Figure 1:
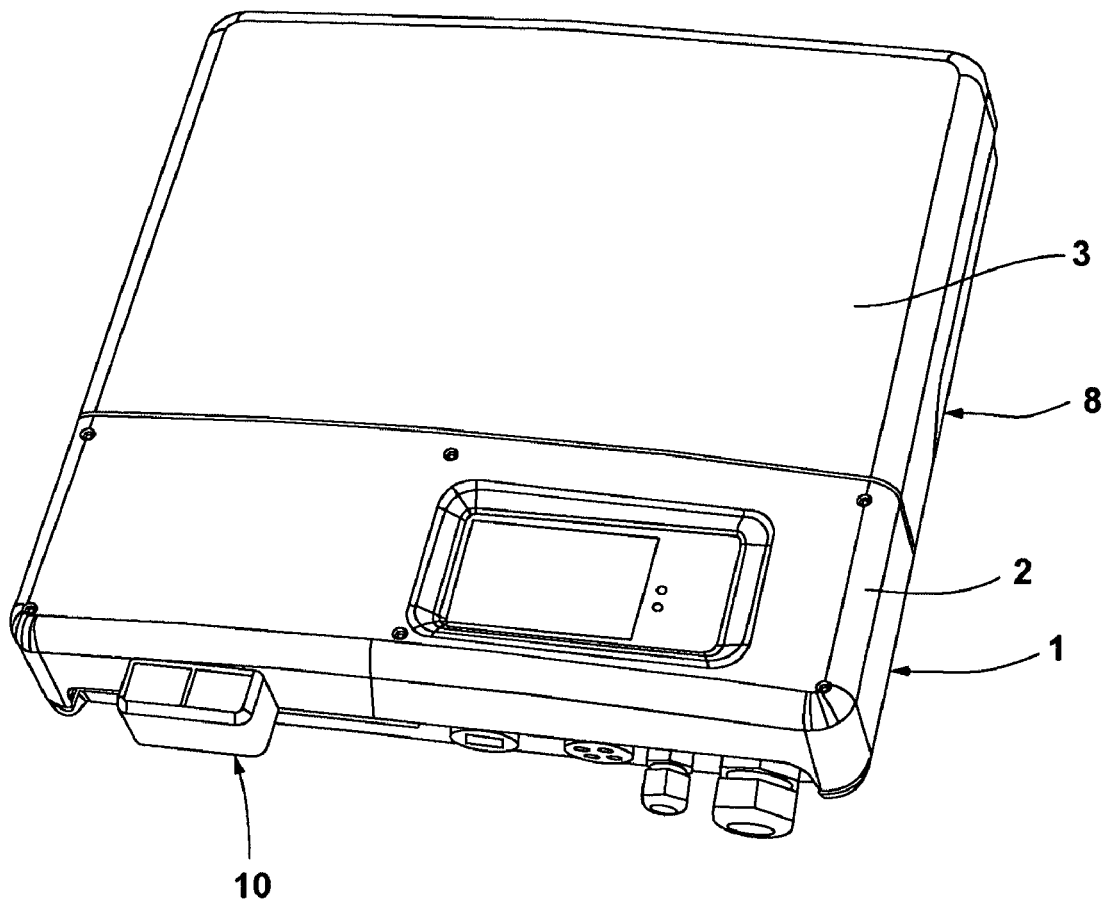
FIG. 1 shows a perspective view of the inverter with two casing covers.

According to FIG. 1, the inverter labelled at 1 with the casing 8 comprises the two casing covers 2 and 3. The one first casing cover 2 is hereby secured from being lifted from the casing 8 with the casing chamber 6 by the security plug labelled at 10 in such a manner that this one first casing cover 2 can only be removed (FIG. 2, FIG. 3) when the safety plug has been pulled after the corresponding screw connections have been unscrewed.

Figure 2:
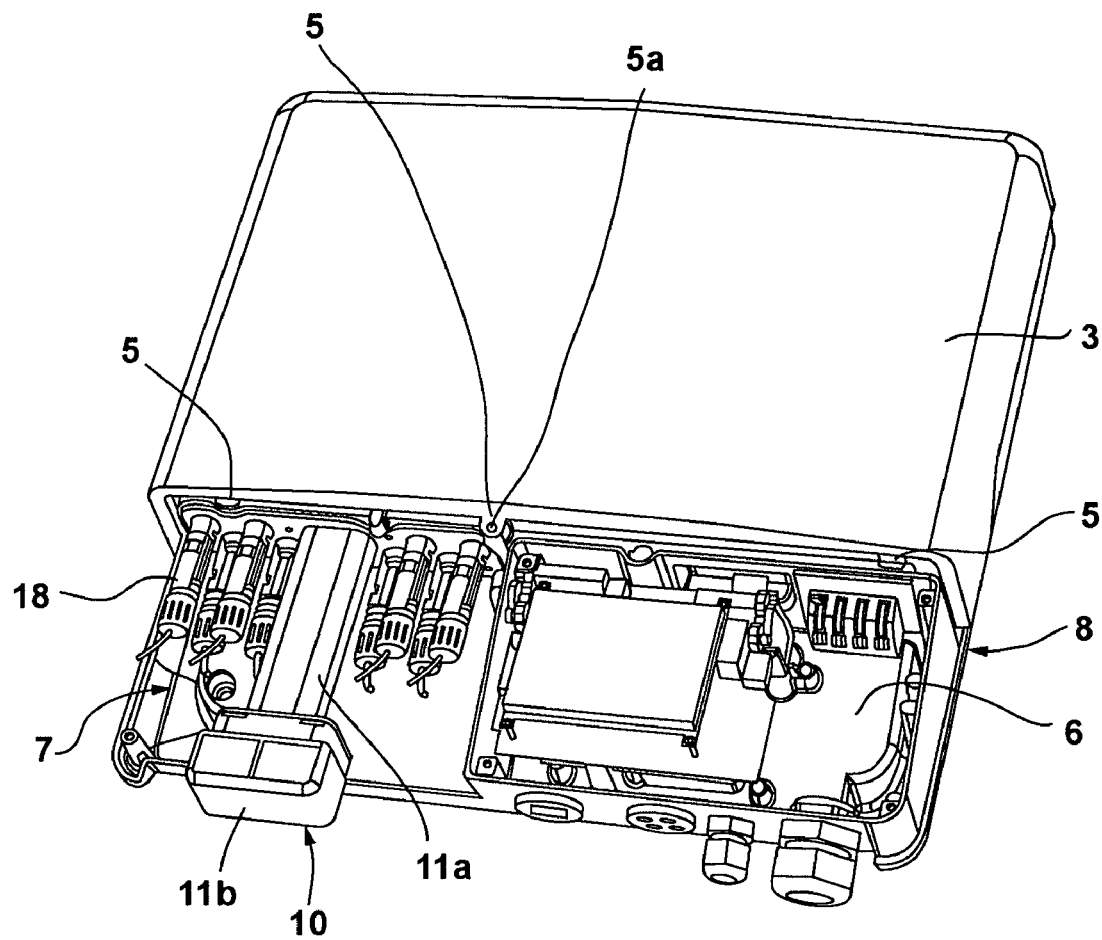
FIG. 2 shows an illustration according to FIG. 1, the one first casing cover having been removed.

When the one first casing cover 2 has been removed, one obtains a view of the inverter as shown in FIG. 2, the plugged safety plug 10 being illustrated without the one first casing cover for reasons of clarity as already explained. It appears that the one first casing cover 2 covers a casing chamber 6 of the casing 8 as well as another chamber-shaped connection region 7 in the housing 8 in which there are provided a plurality of plugs and sockets 18 and also, as already explained, the safety plug 10.

Another subject matter of the invention is also to secure the other, second cover 3 from being removed by the one first cover 2. In this context, it is noted that the other, second cover 3 that covers the casing chamber 6a comprises several flaps 5 (FIG. 2), the other, second cover 3 being fixed to the casing through the one flap 5 by means of a screw 5a. Together with the screw 5a, this flap 5 is covered by the one first casing cover 2 in just the same way as the other two flaps 5.

Figure 3:
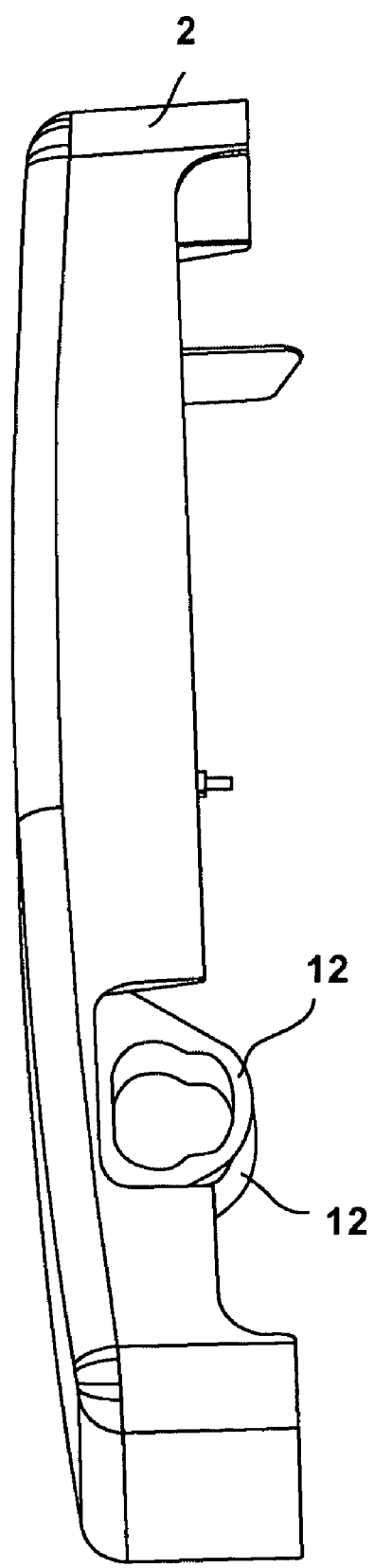
FIG. 3 shows a perspective illustration of the one first casing cover.
Figure 4:
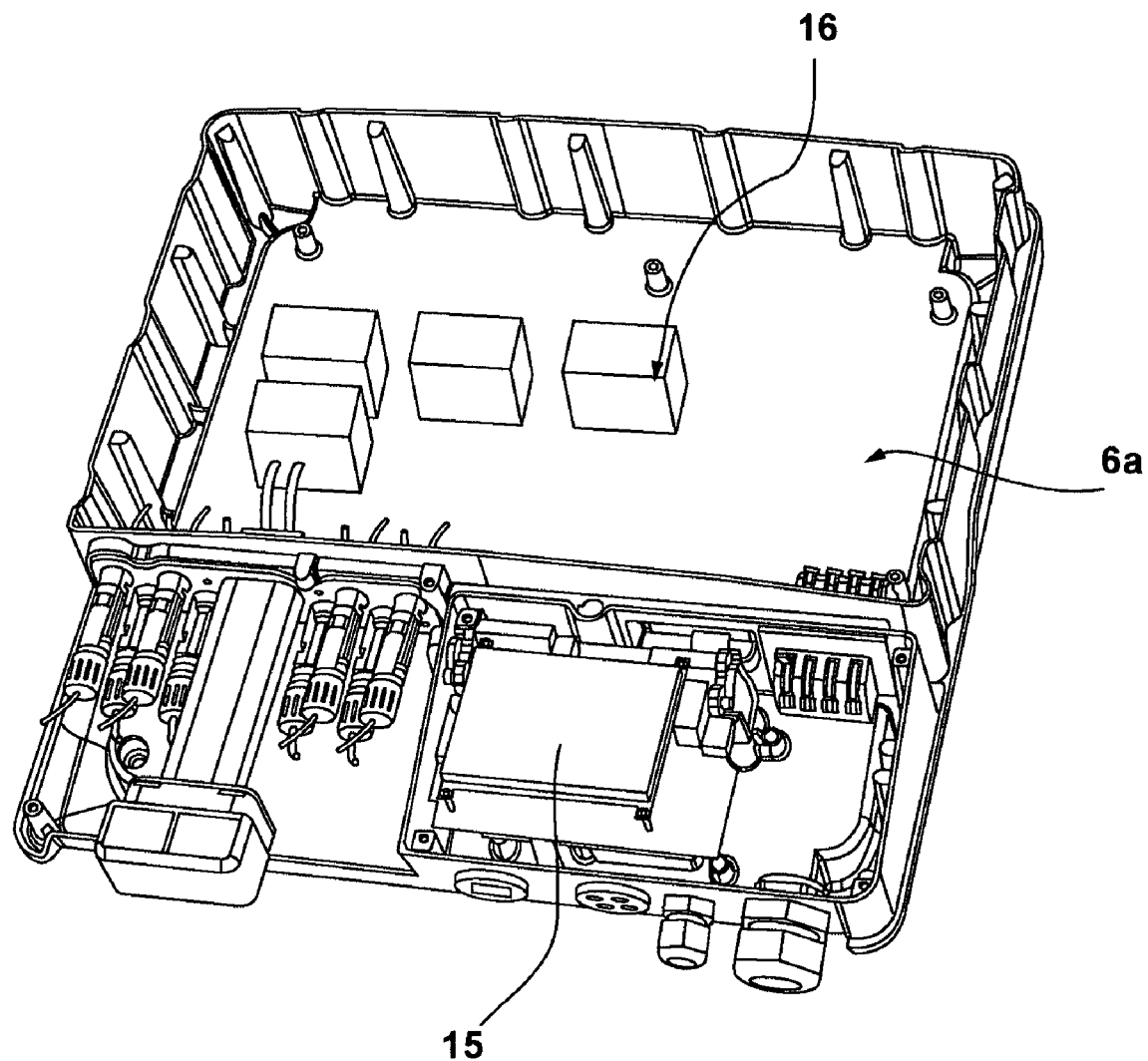
FIG. 4 shows the inverter casing without any casing cover.

Another object of the invention is the design of the cover 2 (see FIG. 3) for securing this one first cover 2 from being lifted when the safety plug 10 is plugged. In FIG. 3, it appears that the one first cover 2 comprises on the casing side, meaning on its inner side, two eyelets 12 located one behind the other through which the body 11a of the plug 10 extends in the plugged condition. This means that the cover 2 cannot be removed and as a result thereof the electronic components 16 in the casing chamber 6a covered by the other second cover 3 cannot be accessed without pulling the safety plug 10 by its head 11b since, as already explained above, the cover 3 is secured by the casing cover 2.

By pulling the safety plug, the inverter is switched off on the DC and on the AC side so that works may be performed at the inverter without any risk.

We claim:

1. An inverter, comprising a casing with first and second casing chambers covered by first and second casing covers, respectively, said first casing cover being mechanically engaged with a safety plug, said safety plug being in electrical connection with a load-current circuit located on a DC side of the inverter, wherein pulling the safety plug from the casing causes a switch to disconnect the inverter at least from the load-current circuit and wherein the first casing cover covers fastening elements of the second casing cover in a closed state.

2. The inverter as set forth in claim 1, wherein the safety plug further connects the inverter to a load-current circuit on an AC side of the inverter.

3. The inverter as set forth in claim 1, wherein the first casing cover comprises at least one eyelet through which the safety plug extends.

4. The inverter as set forth in claim 3, wherein the safety plug comprises a plug head and a plug body, said plug body extending through the at least one eyelet of the first casing cover.

5. The inverter as set forth in claim 1, wherein the first casing chamber comprises electrical connecting elements including at least one of the following: a plug, a socket, or an electronic component.

6. The inverter as set forth in claim 1, wherein the second casing chamber accommodates electronic components of the inverter.

7. The inverter as set forth in claim 1, wherein the first casing chamber comprises a communication unit with a display.

8. An inverter comprising a casing with a first casing cover covering a first casing chamber, the first casing cover being mechanically locked by a safety plug when the safety plug is in an inserted position, and the first casing cover being removable when the safety plug is in a pulled out position, wherein the safety plug is configured to toggle a switch when the safety plug is pulled out of the casing, thereby disconnecting the inverter from a DC-side-load-current circuit, wherein the safety plug is configured to further disconnect an AC-side-load-current circuit when pulled out of the casing.

9. An inverter comprising a casing with a first casing cover covering a first casing chamber and a second casing chamber with a second casing cover, the first casing cover being mechanically locked by a safety plug when the safety plug is in an inserted position, and the first casing cover being removable when the safety plug is in a pulled out position, wherein the safety plug is configured to toggle a switch when the safety plug is pulled out of the casing, thereby disconnecting the inverter from a DC-side-load-current circuit, wherein the first casing cover is arranged such that the second casing cover can only be removed after removal of the first casing cover.

* * * * *